United States Patent
Saine et al.

[11] Patent Number: 6,014,504
[45] Date of Patent: *Jan. 11, 2000

[54] VME FAULT INSERTION AND TEST APPARATUS

[75] Inventors: David C. Saine, Brea; Gerald E. Held, Santa Ana; David A. Norris, Brea, all of Calif.

[73] Assignee: Raytheon Company, Lexington, Mass.

[*] Notice: This patent issued on a continued prosecution application filed under 37 CFR 1.53(d), and is subject to the twenty year patent term provisions of 35 U.S.C. 154(a)(2).

[21] Appl. No.: 08/703,607

[22] Filed: Aug. 27, 1996

Related U.S. Application Data

[63] Continuation of application No. 08/703,607, Aug. 27, 1996.
[51] Int. Cl.$^7$ ................................................ G01R 31/02
[52] U.S. Cl. ................................................ 395/500.03
[58] Field of Search ..................... 364/483, 492, 364/550, 551.01, 578; 371/22.01, 22.06, 30, 32, 33; 395/183.01, 183.09, 183.15, 183.22, 500.44

[56] References Cited

U.S. PATENT DOCUMENTS

| | | | |
|---|---|---|---|
| 4,184,940 | 1/1980 | Underwood et al. | 364/200 |
| 4,870,704 | 9/1989 | Metelan et al. | 364/200 |
| 5,204,864 | 4/1993 | Won | 371/29.5 |
| 5,223,788 | 6/1993 | Andreano | 395/183.01 |
| 5,513,339 | 4/1996 | Agrawal et al. | 395/500 |
| 5,584,020 | 12/1996 | Takasaki | 395/500 |
| 5,633,813 | 5/1997 | Srinivan | 364/578 |

*Primary Examiner*—Kevin J. Teska
*Assistant Examiner*—Thuan Do
*Attorney, Agent, or Firm*—William C. Schubert; Glenn H. Lenzen, Jr.

[57] ABSTRACT

Fault simulation apparatus 10 that simulates faults in a piece of equipment 12 coupled to a VME bus 11. A computer 30 generates user defined faults that are to be simulated and provides initialization data and control signals to VME fault insertion apparatus 20 coupled between the VME bus 11 and the piece of equipment 12. The VME fault insertion apparatus 20 comprises bus fault logic 15 interposed in request and acknowledgment signal lines and data lines, that intercepts normal bus data transmission, and inserts user-defined data into bus data that is transmitted to the equipment 12 to simulate failures therein in response to fault definition signals 23. A fault processor 16 receives initialization data and control signals from the computer 30, sets an address of the VME fault insertion apparatus 20, interprets received commands, outputs address select signals that decode the address lines, and outputs fault definition signals 23 to the bus fault logic 15 in response to the initialization data and control signals that define the fault that is to be simulated. Function select logic 13 decodes the address lines in response to the address select signals provided by the fault processor 16 that enables selected data paths through the bus fault logic 15. Using the present invention, a user can easily activate and deactivate simulated faults in the equipment 12. Failures are activated and deactivated at the computer via an easy-to-use computer interface.

19 Claims, 5 Drawing Sheets

VME FAULT INSERTION AND TEST APPARATUS

This is a continuation application of Serial No. 08/703,607 FILED Aug. 27, 1996.

BACKGROUND

The present invention relates generally to technical hands-on maintenance training apparatus and systems, and more particularly, to apparatus for simulating hardware failures in a piece of equipment having a VME architecture that supports system and subsystem troubleshooting.

Heretofore, the only available technique of providing fault insertion for equipment having a VME bus architecture, was to design and implement a pre-faulted module. A pre-faulted module is an actual circuit card that is electrically altered in order to provide a controlled set of fault symptoms. In a training lab environment, to insert a fault into the equipment, a training instructor would power down the equipment that is to be tested, excuse students from the training lab, insert the pre-faulted module into the equipment, power up the equipment, and call the students back into the lab.

Disadvantages of using the pre-faulted modules include the need to alter or modify an actual VME circuit card, which may cost on the order of the tens of thousands of dollars, lost training time during installation of the pre-faulted module, and each pre-faulted module only simulates one failure.

The assignee of the present invention provides customer training and logistics management support to military customers that purchase its weapon and control systems, for example. An existing product developed by the assignee of the present invention known as an HFC-198 fault insertion device is used to fault test these weapon and control systems. However, the HFC-198 fault insertion device can only be deployed in equipment dedicated to maintenance training because its installation requires modification of backplane wiring of the tested equipment. Therefore, the HFC-198 fault insertion device cannot be installed in equipment that is designated for tactical or operational missions.

Accordingly, it is an objective of the present invention to provide for apparatus that simulates hardware failures in a piece of equipment having a VME architecture, and which does not require modification of VME circuit cards or backplane, simulates many types of failures, and is relatively cost effective.

SUMMARY OF THE INVENTION

To meet the above and other objectives, the present invention provides for VME fault insertion apparatus, also referred to as a VME fault insertion device or circuit card, that comprises a VME circuit card that permits simulation of failures in equipment having a VME bus architecture. The present invention may be used to support hands-on maintenance training of operators of military or commercial VME equipment, as well as support of maintainability and logistic demonstration activities.

More specifically, the fault simulation apparatus simulates faults in a piece of equipment coupled to a VME bus. The fault simulation apparatus comprises a computer for generating user defined faults that are to be simulated in the piece of equipment and which provides initialization data and control signals. A VME fault insertion circuit card is coupled between the VME bus and the piece of equipment that comprises a plurality of address lines for coupling VME addresses between the VME bus and the piece of equipment, a plurality of data lines for coupling data between the VME bus and the piece of equipment, a plurality of interrupt request lines, and data and interrupt acknowledgment signal lines.

Bus fault logic is interposed in the request signal line, acknowledgment signal line, and the plurality of data lines, and is used to pass request signals, acknowledgment signals, and data between the VME bus and the piece of equipment. The bus fault logic intercepts normal bus data transmission, and substitutes or inserts user-defined data into the bus data that is transmitted to or from the equipment to simulate failures in the equipment in response to fault definition signals.

A fault processor is coupled to the computer and receives initialization data and control signals therefrom, and sets an address of the VME fault insertion circuit card, interprets the received commands, outputs address select signals that decode the address lines. The fault processor outputs fault definition signals to the bus fault logic in response to the initialization data and control signals derived from the computer that define the fault that is to be simulated. Function select logic is coupled to the plurality of address lines that decodes the address lines in response to the address select signals provided by the fault processor and enables selected data, interrupt and acknowledge paths through bus fault logic.

The VME fault insertion apparatus receives commands and control data input by a user from the computer. The VME fault insertion apparatus interprets the commands, intercepts normal bus data transmission, and substitutes or inserts user-defined data into the bus data that is transmitted to or from the equipment to simulate failures on VME circuit cards that are part of the equipment. Using the present invention, a user can easily activate and deactivate simulated faults. Failures are activated and deactivated at the computer via an easy-to-use computer interface.

A single VME fault insertion circuit card may be used to simulate hundreds of failures. The VME fault insertion circuit card is physically installed between a VME bus and the circuit card in the equipment whose faults are to be simulated. Each of the data bits that is transferred to or from the instructor station to the tested VME circuit card, may be controlled by the user. In addition, all interrupt and acknowledge lines may be controlled by the user.

In contrast to the HFC-198 fault insertion device, the VME fault insertion apparatus may be used with and does not require any modification of equipment that is designated for tactical or operational missions. It may easily be installed or removed from the equipment, as necessary. The VME fault insertion apparatus may also be used to test automotive or any other electronics having VME bus architectures.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
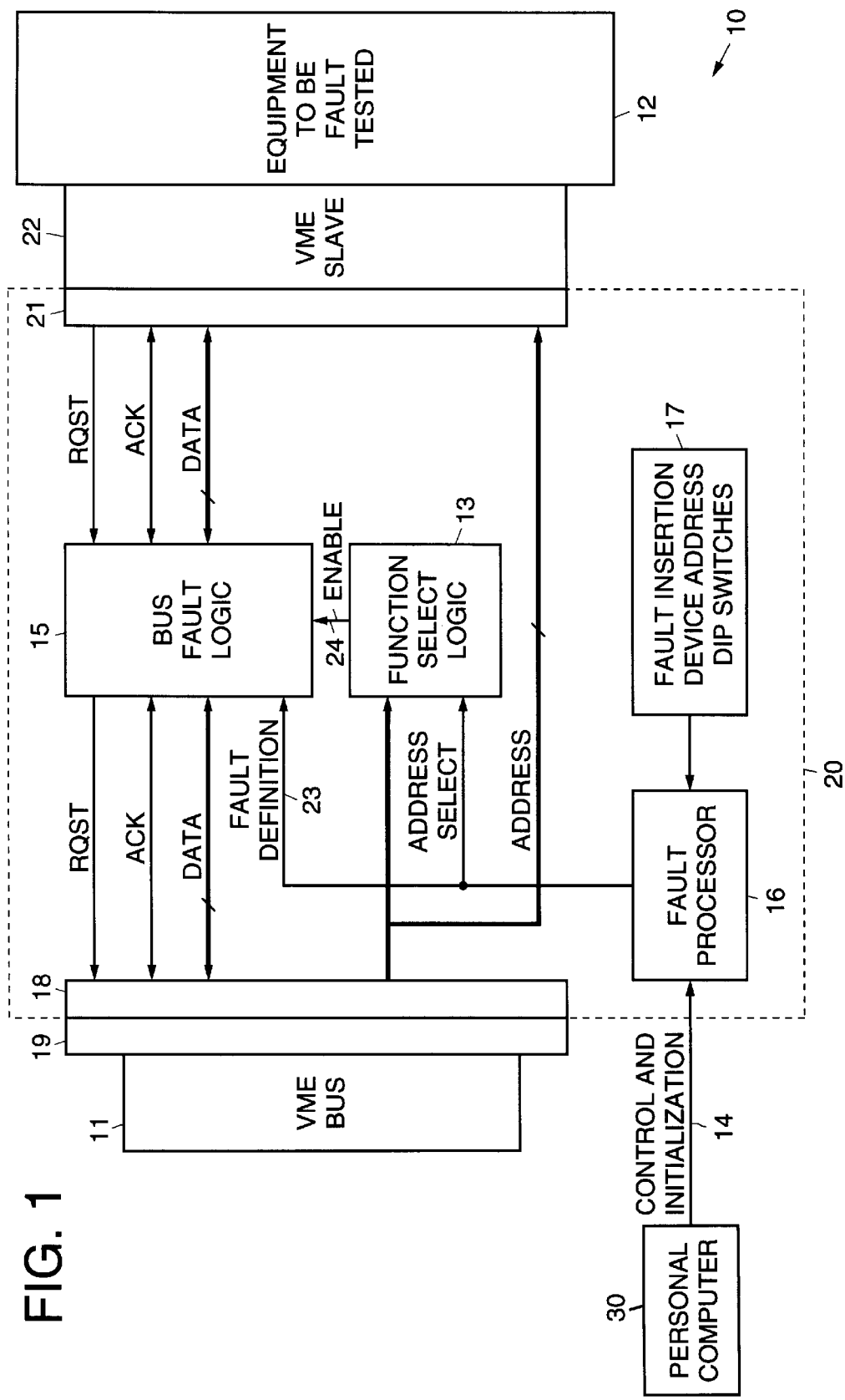
FIG. 1 is a simplified block diagram of fault simulation apparatus in accordance with the principles of the present invention.

Referring to the drawing figures, FIG. 1 is a simplified block diagram of fault simulation apparatus 10 in accordance with the principles of the present invention. The fault simulation apparatus 10 includes a computer 30, such as a personal computer 30 or a PC instructor station 30 of a HFC-198 fault insertion device, for example. The computer 30 is coupled to VME fault insertion apparatus 20 in accordance with the present invention, which is referred to as a VME fault insertion device 20 or VME fault insertion circuit card 20.

The VME fault insertion circuit card 20 is coupled between a VME bus 11 and a piece of equipment 12 comprising a VME circuit card assembly 12 whose faults are to be simulated. The VME fault insertion circuit card 20 is connected to the VME bus 11 by way of male connectors 18 that plug into the VME chassis connectors 19. Female connectors 21 on the VME fault insertion card 20 are inserted into mating VME connectors 22 on the VME circuit card assembly 12. The VME fault insertion card 20 therefore is a daughter card that is physically installed between the VME bus 11 and the VME circuit card assembly 12. A single VME fault insertion card 20 for each VME circuit card assembly 12 whose faults are to be simulated.

The VME fault insertion circuit card 20 comprises function select logic 13 which is used to select or enable selected data paths through bus fault logic 15. The bus fault logic 15 passes request signals (RQST), acknowledgment signals (ACK), and data (32 lines) between the VME bus 11 and a slave VME bus 1 a coupled to the VME circuit card assembly 12 whose faults are to be simulated. A fault processor 16 is provided that receives initialization data and control signals from the computer 30 or PC instructor station 30. The fault processor 16 is coupled to a plurality of address dip switches 17 that define the address of the VME fault insertion circuit card 20. The fault processor 16 outputs address select signals to the function select logic 13. The function select logic 13 receives addresses from the VME bus 11, and decodes the address lines in response to the address select signals provided by the fault processor 16.

In addition, the addresses are passed through to the VME circuit card assembly 12. The fault processor 16 also outputs fault definition signals 23 to the bus fault logic 15 in response to the initialization data and control signals derived from the computer 30 or PC instructor station 30.

Figure 2:
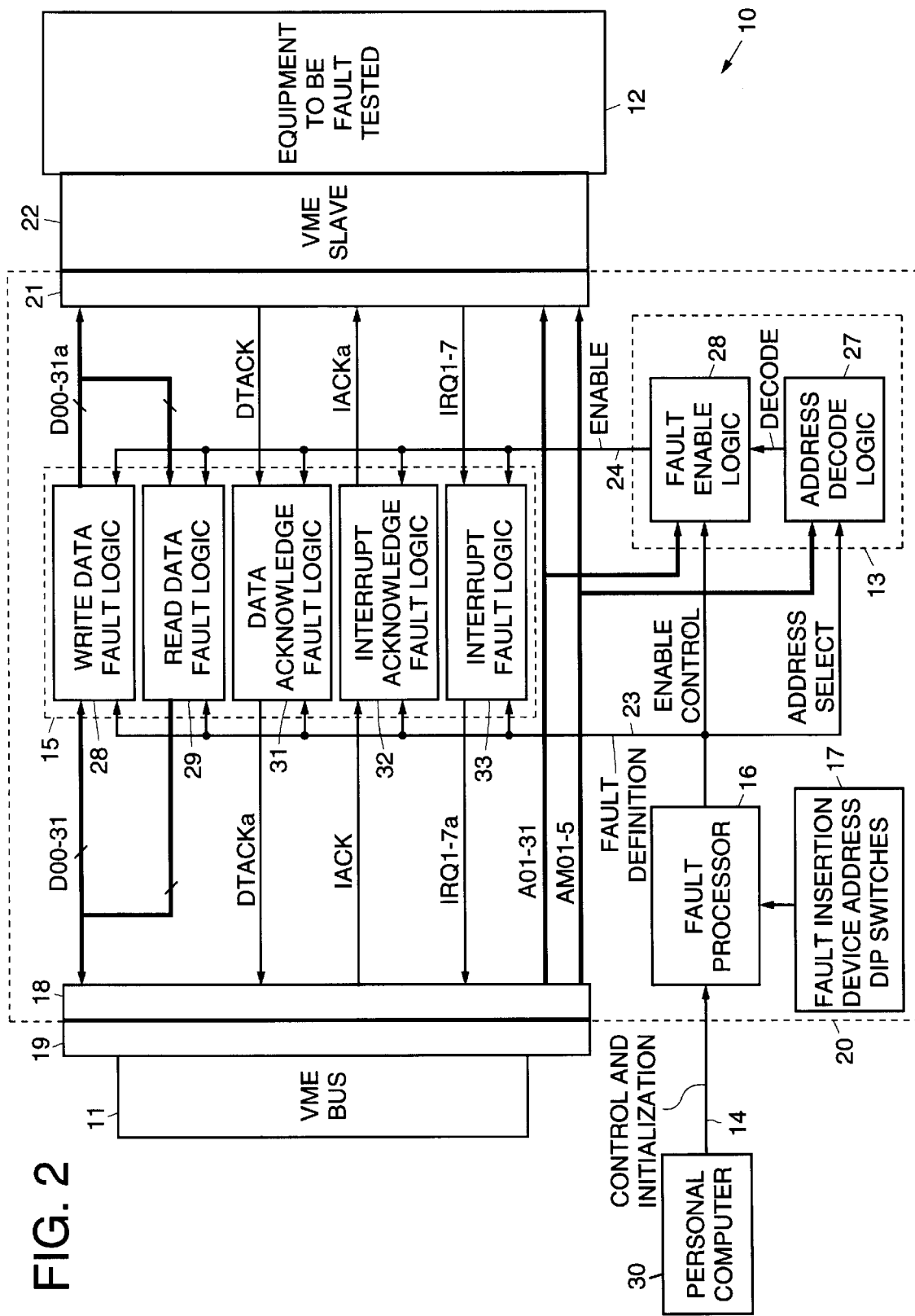
FIG. 2 is a more detailed block diagram of the fault simulation apparatus of FIG. 1.

Referring to FIG. 2, it shows a more detailed block diagram of the fault simulation apparatus 10 of FIG. 1. The fault processor 16 comprises a microcontroller 16, such as a MC68HC11E9 microcontroller 16, for example. The fault processor 16 receives the control and initialization signals from the computer 30 and generates the address select signals that are coupled to the function select logic 13. A familiarity with ANSI/IEEE Std. 1014–1987, entitled "IEEE Standard for a Versatile Backplane Bus: VMEbus" is desirable for understanding the implementation of the VME fault insertion card 20 of the present invention.

The function select logic 13 comprises address decode logic 26 coupled to fault enable logic 27 by way of decode signal lines 25 that together control an enable signal line 24 used to tell the bus fault logic 15 when to insert a fault or faults. The function select logic 13 determines when faults are enabled and inserted into VME signal paths of the thirty-two data lines (D00–D31), the seven interrupt lines (IRQ1–IRQ7), and the two acknowledge lines (DTACK, IACK). DTACK refers to the data acknowledge line and IACK refers to the interrupt acknowledge line. The function select logic 13 comprises address decode logic 26 and fault enable logic 27, a set of thirty-one address lines A01–31, and a set of six address modifier lines (AM0–5).

The bus fault logic 15 is comprised of thirty-two identical sets of write data fault logic 28 for insertion of write data faults in any one or all data lines (D00–D31), thirty two identical sets of read data fault logic 29 for inserting read faults in any one or all data lines (D00–D31), data acknowledge fault logic 31 for fault insertion in the DTACK signal line, interrupt acknowledge fault logic 32 for fault insertion in the IACK signal line, and seven sets of interrupt fault logic 33 for fault insertion in the signal lines (IRQ1–IRQ7).

Figure 3:
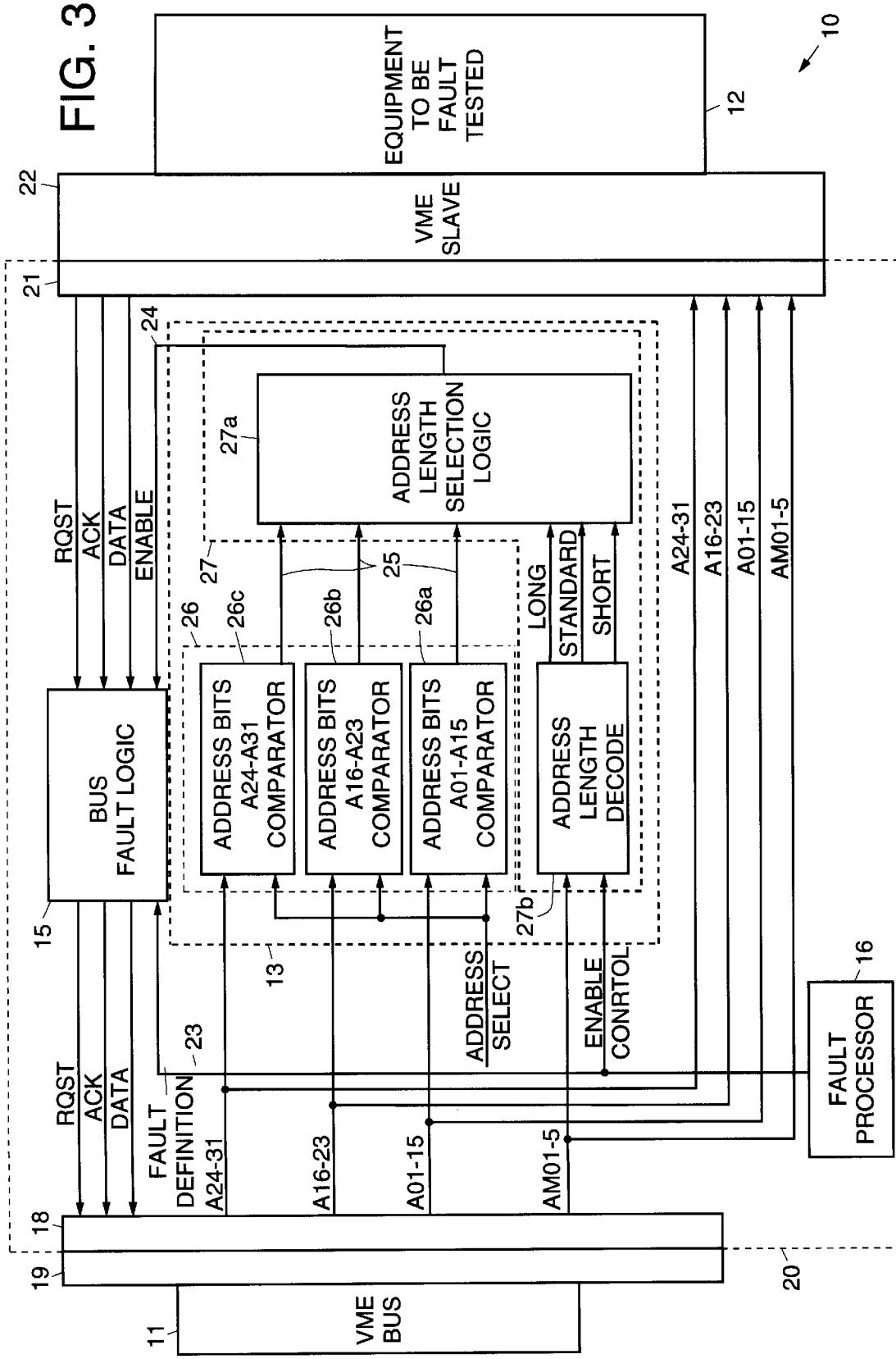
FIG. 3 shows a detailed diagram of the function select logic employed in the fault simulation apparatus of FIGS. 1 and 2.

FIG. 3 shows a detailed diagram of the function select logic 13 employed in the fault simulation apparatus 10 of FIGS. 1 and 2. The function select logic 13 comprises address decode logic 26 for providing the decode signal lines 25 to the fault enable logic 27 which in turn activates the enable signal line 24 when the address of the address bus A01–31 is equal to the address selected by the operator and loaded via the computer 30 and fault processor 16 in the function select logic 13. The enable signal line 24, when activated, will permit the bus fault logic 15 to insert previously selected faults onto the data, request, and acknowledge lines.

The address decode logic 26 is comprised of three independent comparators 26a, 26b, 26c (for A01–15, A16–23, and A24–31, respectively), the selection of which is based upon ANSI/IEEE Std. 1014–1987 use of three addressing modes short, standard, and long. The fault enable logic 27 comprises address length decode logic 27a and address length selection logic 27b. The address length decode logic 27a uses the six address modifier signal lines AM0–5 to determine the type of address or address length presented to the fault insertion card 20 by the VME bus 11. The decoding of the address modifier lines is based upon ANSI/IEEE Std. 1014–1987 and provides a long, standard, and short address signal line to the address length selection logic.

Figure 4:
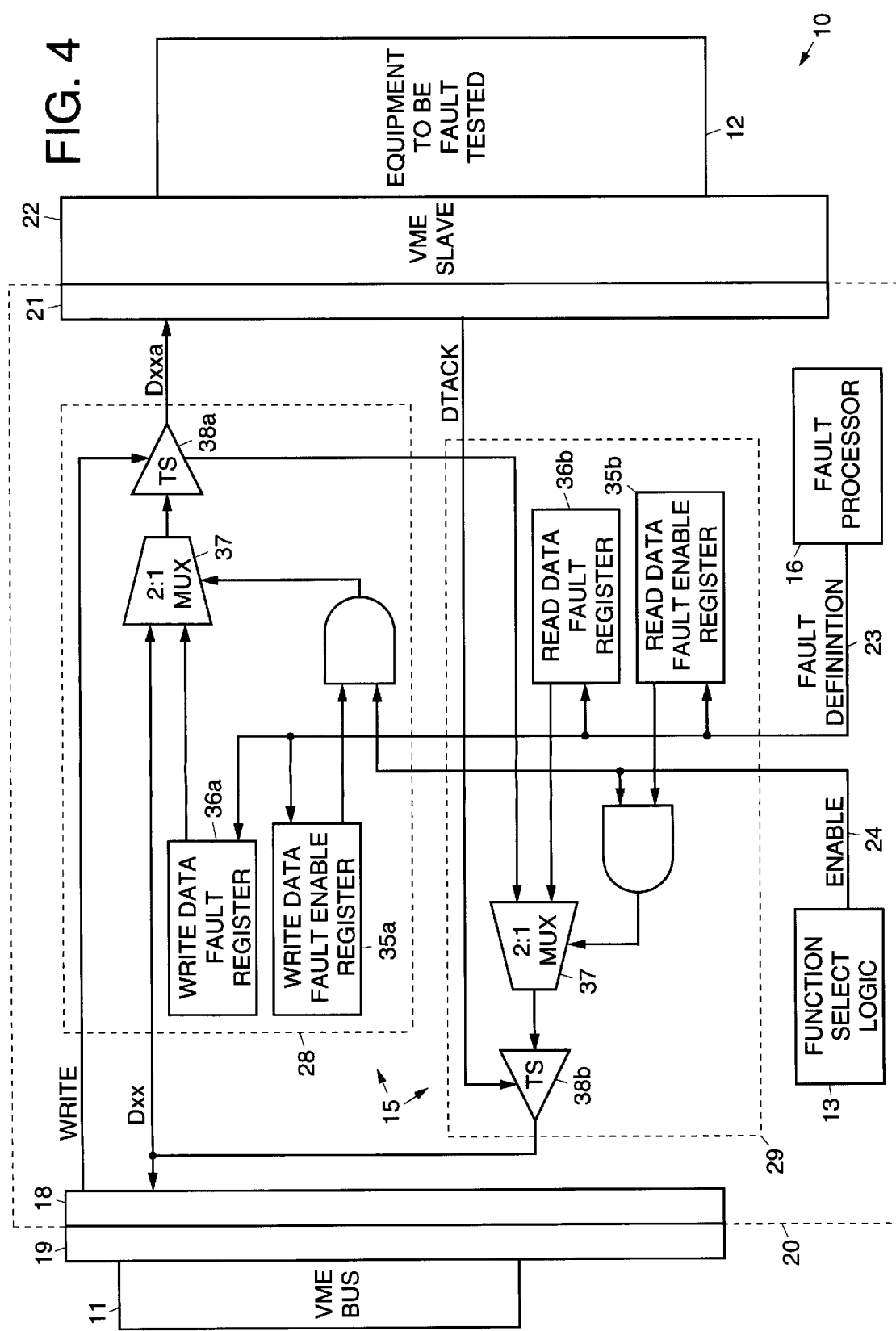
FIGS. 4 and 5 show a detailed diagram of the bus fault logic employed in the fault simulation apparatus of FIGS. 1 and 2.

FIG. 4 shows a detailed diagram of the bus fault logic 15 employed in the fault simulation apparatus 10 of FIGS. 1 and 2. The bus fault logic 15 comprises write data fault logic 28 for each of the thirty-two data lines (D00–31) shown in FIG. 4, read data fault logic 29 for each of the thirty-two data lines (D00–31) shown in FIG. 4, data acknowledge fault logic 31 for the data acknowledge signal line DTACK shown in FIG. 5, and interrupt fault logic 33 for each of the seven interrupt request lines (IRQ1–IRQ7) shown in FIG. 5.

FIG. 4 shows the write data fault logic 28 and the read data fault logic 29 for a signal data bit. The bus fault logic 15 is comprised of thirty-two parallel data paths each containing a single write data fault logic 28 and a signal read data fault logic 29. Both the write data fault logic 28 and the read data fault logic 29 operate in a similar manner and contain either a write or read data fault enable register 35a, 35b indicating if its data bit is to be faulted when the enable signal line 24 is activated and an enable signal from the function select logic is received. A read or write data fault register 36a, 36b indicates whether to fault the data bit high or low. In both the read and write data fault logic 29, 28, a 2:1 multiplexer 37 is used to select between normal data and the desired fault. The fault data high or low signal is switched to the output of the multiplexer 37 only when both the corresponding data fault enable register 35a, 35b and the enable signal line 24 are true. Since the VME bus data lines are bidirectional, the output of each multiplexer 37 is passed through a write tri-state buffer 38a (TS) and put data on the Dxxa data lines. In a similar manner, DTACK is used to control the read data tristate buffer 38b which puts data on the Dxx lines.

Figure 5:
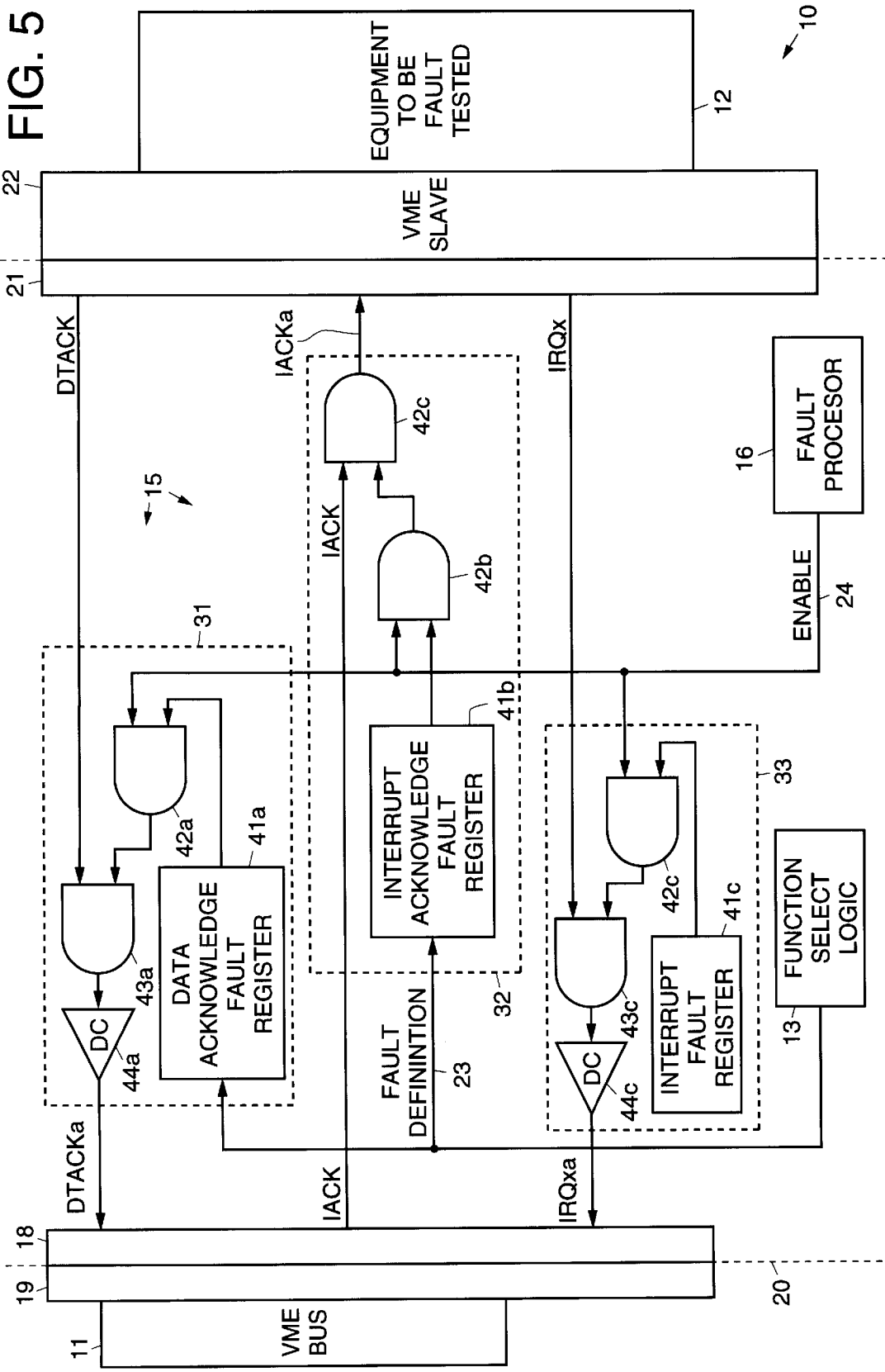

FIG. 5 shows a detailed diagram of the data acknowledge fault logic 31, the interrupt acknowledge fault logic 32, and the interrupt fault logic 33, all three of which function in a similar manner. The data acknowledge fault logic 31 contains a data acknowledge fault register 41a, logic gates 42a, 43a and an output buffer (DC) 44a. The interrupt acknowledge fault logic 32 contains an interrupt acknowledge fault register 41b, and logic gates 42b, 43b. The interrupt fault logic 33 contains an interrupt fault register 41c, logic gates 42c, 43c and an output buffer (DC) 44c.

The data acknowledge fault logic 31 either passes the data acknowledge signal line DTACK in normal unfaulted operation or blocks to insert a fault. When the data acknowledge fault register 41a is set true and the enable signal is received, the DTACK line is blocked and will not be allowed to pass from DTACK to DTACKa. The interrupt acknowledge fault logic 32 operates in the same manner as the data acknowledge fault logic 31 with the IACK either being passed or not passed to the IACKa line. The interrupt fault logic 33 contains seven parallel sets of logic for fault insertion into the seven interrupt lines (IRQ1–IRQ7), with the IRQx signal being passed or not passed to the IRQxa line.

In operation, the fault processor 16 receives the initialization data and control signals from the computer 30, such as is provided by an instructor station 30 of the HFC-198 fault insertion device, for example. Once initialized, the VME fault insertion circuit card 20 allows the user to activate or deactivate a simulated failure via keyboard of the computer 30. The computer 30 displays a menu of active faults to the user, and displays a textual description of fault symptoms and probable causes of failure.

The VME fault insertion circuit card 20 is designed to connect to the VME bus 11 through the VME chassis connectors 19 that is part of the VME circuit card assembly 12. The male connectors 18 of the VME fault insertion circuit card 20 plug into the VME chassis connectors 19 and the female connectors 21 mate with mate with the VME connectors 22 on the VME circuit card assembly 12. Normal signal paths for VME bus lines pass through the VME fault insertion circuit card 20 and are altered or passed through unchanged depending on user defined initialization data and commands. The VME fault insertion circuit card 20 provides the ability to force one or more of thirty-two VME data bus bits (D00–D31) high or low during a read or write operation, disable data acknowledge (DTACK), disable interrupt requests (IRQ1–IRQ7), and disable interrupt acknowledge (JACK).

The function select logic 13 decodes the address lines on the VME bus 11. If the address on the VME bus 11 matches the function address of the VME circuit card assembly 12, and if the VME fault insertion circuit card 20 has been activated via control signals 14 received from the computer 30 or instructor station 30, the bus fault logic 15 is enabled.

The bus fault logic 15 provides a means for simulating fault symptoms by altering (masking) the data (in either direction) that is transmitted between the VME circuit card assembly 12 and the VME bus 11. For example, the function select logic 13 may be used to enable a fault in a particular segment of the VME circuit card assembly 12. That particular segment performs its function and passes data to the bus fault logic 15. If data bus data errors are enabled, the data received from the VME circuit card assembly 12 is altered and sent to the VME bus 11, simulating the fault.

The fault processor 16 controls the type of fault that is inserted. Initialization data and commands sent to the VME fault insertion circuit card 20 from the computer 30 identify the specific VME bus lines to be faulted. Control signals 14 comprising serial control data and commands are transmitted from the computer 30 under operator control. The fault processor 16 interprets the commands and stores the control data during initialization. Once initialized, the operator can activate or deactivate faults by initiating the appropriate action using the keyboard of the computer 30. The fault processor 16 interprets these commands and either enables or disables fault simulation. When faults are enabled, a fault definition control signal 23 is sent to the bus fault logic 15 to enable the appropriate fault.

Each VME fault insertion circuit card 20 is addressable by use of a 7-position DIP switch 17 which allows the simultaneous use of multiple VME fault insertion circuit cards 20. A maximum of 128 addresses are available, which means that 128 VME fault insertion circuit card 20 may be addressed and used at one time, if desired.

Fault control messages that are valid for the VME fault insertion circuit card 20 are shown in Table 1. There are six messages, five sent from the computer 30 and one status message sent back to the computer 30. Byte 1 of each message defines the message type. Byte 2 of message types 1 and 3–6 defines the card address (0–127) of each VME fault insertion circuit card 20. The last byte of each message is a carriage return (013 decimal) represented by "0D" in hexadecimal notation. In Table 1, hexadecimal notation is indicated by two digits followed by "&h". For example hexadecimal 0D is indicated as 0D&h.

TABLE 1

| Control Message Types | | | |
|---|---|---|---|
| Type | Message | Bytes | Format |
| 1 | Card fault control | 55 | 80&h + card # + 52 control bytes + 0D&h |
| 2 | Reset | 2 | 81&h + 0D&h |
| 3 | Card fault off | 3 | 82&h + card # + 0D&h |
| 4 | Card fault on | 3 | 83&h + card # + 0D&h |
| 5 | Request status | 3 | 84&h + card # + 0D&h |
| 6 | Status report | 55 | 85&h + card # + 52 control bytes + 0D&h |

A demonstration and proof of concept VME fault insertion circuit card 20 was developed and tested. The equipment used as the VME circuit card assembly 12 that was tested for demonstration purposes was a Net Control Station EPLRS Trainer (NCSET) manufactured by the assignee of the present invention, which has a VME architecture I/O subsystem. A specific fault was designed based upon use of this piece of equipment.

The VME fault insertion circuit card 20 was inserted between a lamp driver circuit card (part umber 1690308-100) in slot 4 of the NCSET I/O subsystem and the VME bus 11. A test was run to determine that the address of the VME fault insertion circuit card 20 could be decoded, the normal data path could be blocked, and user defined data could be placed on the bus 11. The selection of the lamp driver circuit card allowed visual proof that failure simulation was successful. The data used for the test was defined in a manner that would simulate a failure in specific area of the lamp driver circuit card, but would not affect any other portion of the lamp driver circuit card.

The fault data was entered at the computer 30 which in this case was the PC instructor station 30 of the HFC-198 fault insertion device, and a command to initiate the fault was transmitted by selecting a fault enable feature at the instructor station 30. A specific trainer exercise was selected that turned on all trainer indicator lamps. The user defined data would prevent eight (8) of the trainer lamps from lighting, if the VME fault insertion circuit card 20 properly masked the data lines.

The test was successfully completed, and predetermined failure symptoms were observed when the VME fault insertion circuit card 20 was activated. When a fault was deactivated at the instructor station 30, and the test was reinitiated, all lamps operated properly indicating that normal bus data was properly transferred between the VME bus 11 and the NCSET I/O subsystem.

Thus, apparatus for simulating hardware failures in a piece of equipment having a VME architecture has been disclosed. It is to be understood that the described embodiment is merely illustrative of some of the many specific embodiments which represent applications of the principles of the present invention. Clearly, numerous and other arrangements can be readily devised by those skilled in the art without departing from the scope of the invention.

What is claimed is:

1. Fault simulation apparatus for simulating faults in a piece of equipment whose faults are to be simulated that is coupled to a VME bus, said apparatus comprising:
   a computer; and
   VME fault insertion apparatus coupled between the VME bus and the piece of equipment, said apparatus comprising:
      a slave VME bus for coupling the VME fault insertion apparatus to the piece of equipment:
      a plurality of address lines for coupling VME addresses between the VME bus and the piece of equipment;
      a plurality of data lines for coupling data between the VME bus and the piece of equipment;
      a plurality of request signal lines;
      a plurality of acknowledgment signal lines for data and interrupt handling;
      bus fault logic interposed in the request signal line, acknowledgment signal lines, and data lines, for selectively passing request signals, acknowledgment signals, and data between the VME bus and the piece of equipment, for intercepting normal bus data transmission, and for inserting user-defined data into the bus data that is transmitted to the equipment to simulate failures in the equipment in response to fault definition signals;
      a fault processor for receiving initialization data and control signals from the computer, for setting an address of the VME fault insertion apparatus, for outputting address select signals that decode the address lines, and for outputting fault definition signals to the bus fault logic that define the fault that is to be simulated in response to the initialization data and control signals derived from the computer; and
      function select logic coupled to the plurality of address lines for decoding the address lines in response to the address select signals provided by the fault processor that enable selected data paths through the bus fault logic.

2. The apparatus of claim 1 wherein the fault processor comprises a plurality of address dip switches that define the address of the VME fault insertion circuit device.

3. The apparatus of claim 1 wherein the function select logic comprises:
   address decode logic; and
   fault enable logic;
   and wherein the address decode logic provides decode signal lines to the fault enable logic which activate an enable signal line when the address of the address bus A01–31 is equal to a selected address loaded via the computer and fault processor in the function select logic.

4. The apparatus of claim 3 wherein the address decode logic comprises:
   three comparators corresponding to predetermined sets of addresses of the address bus, respectively.

5. The apparatus of claim 4 wherein the predetermined sets of addresses comprise the A01–15, A16–23, and A24–31 addresses of the address bus, respectively.

6. The apparatus of claim 3 wherein the fault enable logic comprises address length decode logic and address length selection logic.

7. The apparatus of claim 6 wherein the address length decode logic uses six address modifier signal lines to determine the type of address or address length presented to the fault insertion device by the VME bus.

8. The apparatus of claim 3 wherein the enable signal line, when activated, permits the bus fault logic to insert previously selected faults onto the data, request, and acknowledge lines.

9. The apparatus of claim 1 wherein the bus fault logic comprises:
   write data fault logic for each of the data lines, read data fault logic for each of the data lines, data acknowledge fault logic for the data acknowledge signal line DTACK, and interrupt fault logic for each of the interrupt request lines.

10. The apparatus of claim 1 wherein the bus fault logic comprises:
    thirty-two sets of write data fault logic for insertion of write data faults in any one or all data lines, thirty two sets of read data fault logic for inserting read faults in any one or all data lines, data acknowledge fault logic for fault insertion in the DTACK signal line, interrupt acknowledge fault logic for fault insertion in the IACK signal line, and seven sets of interrupt fault logic for fault insertion in the signal lines.

11. The apparatus of claim 10 wherein the write data fault logic for each data bit comprises:
    a write data fault enable register indicating if its data bit is to be faulted when the enable signal from the function select logic is received;
    a 2:1 multiplexer coupled to the write data fault enable register for selecting between normal data and the desired fault;
    a write tri-state buffer coupled between the 2:1 multiplexer and Dxxa data lines of the VME bus;
    and wherein a fault data high or low signal is switched to the output of the multiplexer only when the write data fault enable register and the enable signal line are true.

12. The apparatus of claim 10 wherein the read data fault logic for each data bit comprises:
    a read data fault enable register indicating if its data bit is to be faulted when the enable signal line is activated and an enable signal from the function select logic is received;
    a 2:1 multiplexer coupled to the read data fault enable register for selecting between normal data and the desired fault, and wherein a fault data high or low signal is switched to the output of the multiplexer only when both the corresponding data fault enable register and the enable signal line are true;

a read data tri-state buffer coupled between the 2:1 multiplexer and Dxx data lines of the VME bus;

and wherein a fault data high or low signal is switched to the output of the multiplexer only when the read data fault enable register and the enable signal line are true.

13. The apparatus 1 of claim 10 wherein the data acknowledge fault logic comprises:

data acknowledge fault register;

a first logic gate coupled to the data acknowledge fault register and coupled to the function select logic for receiving enable signals; and a second logic gate coupled to the first logic gate and to the DTACK line of the VME bus; and an output buffer coupled to an output of the second logic gate and coupled to the DTACK line of the VME bus;

and wherein the data acknowledge fault logic either passes the data acknowledge signal line DTACK in normal unfaulted operation or blocks to insert a fault.

14. The apparatus of claim 10 wherein the interrupt acknowledge fault logic 32 comprises:

an interrupt acknowledge fault register; and a first logic gate coupled to the interrupt acknowledge fault register and coupled to the function select logic for receiving enable signals;

a second logic gate coupled to the first logic gate and to the IACK line of the VME bus; and an output buffer coupled to an output of the second logic gate and coupled to the DTACK line of the VME bus;

and wherein the interrupt acknowledge fault logic either passes the interrupt acknowledge signal line IACK in normal unfaulted operation or blocks to insert a fault.

15. The apparatus of claim 10 wherein the interrupt fault logic comprises:

seven parallel sets of logic for fault insertion into the seven interrupt lines, with the IRQz signal being passed or not passed to the IRQxa line.

16. Fault simulation apparatus for simulating faults in a piece of equipment whose faults are to be simulated that is coupled to a VME bus, said apparatus comprising:

a computer; and

VME fault insertion apparatus coupled between the VME bus and the piece of equipment, said apparatus comprising:

a plurality of address lines for coupling VME addresses between the VME bus and the piece of equipment;

a plurality of data lines for coupling data between the VME bus and the piece of equipment;

a plurality of request signal lines;

a plurality of acknowledgment signal lines for data and interrupt handling;

bus fault logic interposed in the request signal line, acknowledgment signal lines, and data lines, for selectively passing request signals, acknowledgment signals, and data between the VME bus and the piece of equipment, for intercepting normal bus data transmission, and for inserting user-defined data into the bus data that is transmitted to the equipment to simulate failures in the equipment in response to fault definition signals, and which comprises thirty-two sets of write data fault logic for insertion of write data faults in any one or all data lines, thirty two sets of read data fault logic for inserting read faults in any one or all data lines, data acknowledge fault logic for fault insertion in the DTACK signal line, interrupt acknowledge fault logic for fault insertion in the IACK signal line, and seven sets of interrupt fault logic for fault insertion in the signal lines, and wherein the bus fault logic comprises:

a write data fault enable register indicating if its data bit is to be faulted when the enable signal from the function select logic is received;

a 2:1 multiplexer coupled to the write data fault enable register for selecting between normal data and the desired fault;

a write tri-state buffer coupled between the 2:1 multiplexer and Dxxa data lines of the VME bus; and and wherein a fault data high or low signal is switched to the output of the multiplexer only when the write data fault enable register and the enable signal line are true;

a fault processor for receiving initialization data and control signals from the computer, for setting an address of the VME fault insertion apparatus, for outputting address select signals that decode the address lines, and outputting fault definition signals to the bus fault logic that define the fault that is to be simulated in response to the initialization data and control signals derived from the computer; and function select logic coupled to the plurality of address lines for decoding the address lines in response to the address select signals provided by the fault processor that enable selected data paths through the bus fault logic.

17. The apparatus of claim 16 wherein the read data fault logic for each data bit comprises:

a read data fault enable register indicating if its data bit is to be faulted when the enable signal line is activated and an enable signal from the function select logic is received;

a 2:1 multiplexer coupled to the read data fault enable register for selecting between normal data and the desired fault, and wherein a fault data high or low signal is switched to the output of the multiplexer only when both the corresponding data fault enable register and the enable signal line are true;

a read data tri-state buffer coupled between the 2:1 multiplexer and Dxx data lines of the VME bus;

and wherein a fault data high or low signal is switched to the output of the multiplexer only when the read data fault enable register and the enable signal line are true.

18. The apparatus of claim 16 wherein the data acknowledge fault logic comprises:

data acknowledge fault register;

a first logic gate coupled to the data acknowledge fault register and coupled to the function select logic for receiving enable signals; and a second logic gate coupled to the first logic gate and to the DTACK line of the VME bus; and an output buffer coupled to an output of the second logic gate and coupled to the DTACK line of the VME bus;

and wherein the data acknowledge fault logic either passes the data acknowledge signal line DTACK in normal unfaulted operation or blocks to insert a fault.

19. The apparatus of claim 16 wherein the interrupt acknowledge fault logic 32 comprises:

an interrupt acknowledge fault register; and a first logic gate coupled to the interrupt acknowledge fault register and coupled to the function select logic for receiving enable signals;

a second logic gate coupled to the first logic gate and to the IACK line of the VME bus; and an output buffer coupled to an output of the second logic gate and coupled to the DTACK line of the VME bus;

and wherein the interrupt acknowledge fault logic either passes the interrupt acknowledge signal line IACK in normal unfaulted operation or blocks to insert a fault.

* * * * *

UNITED STATES PATENT AND TRADEMARK OFFICE
CERTIFICATE OF CORRECTION

PATENT NO. : 6,014,504
DATED      : January 11, 2000
INVENTOR(S): David C. Saine, Brea; Gerald E. Held, Santa Ana; David A. Norrid, Brea, all of Calif.

It is certified that error appears in the above-identified patent and that said Letters Patent is hereby corrected as shown below:

On the title page: Item [75] Inventors:

Danny C. Saine, Brea; Gerald E. Held, Santa Ana; David A. Norris, Brea, all of Calif.

Signed and Sealed this

Ninth Day of January, 2001

*Attest:*

Q. TODD DICKINSON

*Attesting Officer*    Commissioner of Patents and Trademarks